(No Model.)

W. T. MOORE.
ANIMAL TRAP.

No. 326,513. Patented Sept. 15, 1885.

WITNESSES
Villette Anderson
Grace M. Craig

INVENTOR
W. T. Moore
by Anderson & Smith
his ATTORNEYS

United States Patent Office.

WILLIAM T. MOORE, OF RICHVIEW, ASSIGNOR OF ONE-HALF TO W. HENRY MOORE, OF NASHVILLE, ILLINOIS.

ANIMAL-TRAP.

SPECIFICATION forming part of Letters Patent No. 326,513, dated September 15, 1885.

Application filed February 14, 1885. (No model.)

*To all whom it may concern:*

Be it known that I, WILLIAM T. MOORE, a citizen of the United States, residing at Richview, in the county of Washington and State of Illinois, have invented certain new and useful Improvements in Animal-Traps; and I do declare the following to be a full, clear, and exact description of the invention, such as will enable others skilled in the art to which it appertains to make and use the same, reference being had to the accompanying drawings, and to letters or figures of reference marked thereon, which form a part of this specification.

Figure 1:
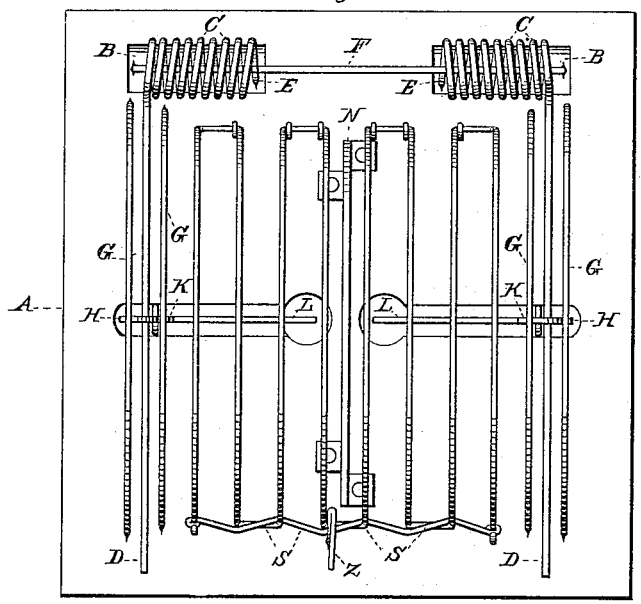
Figure 3:
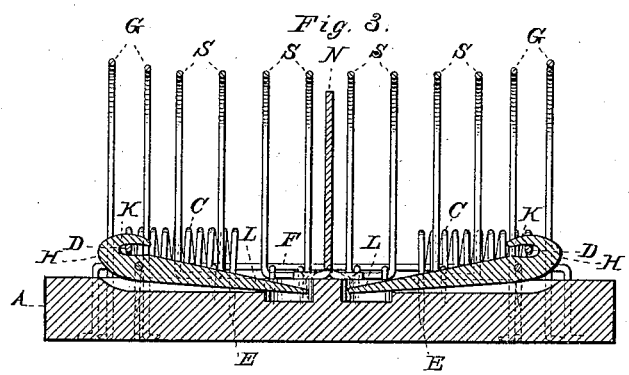
Figure 2:
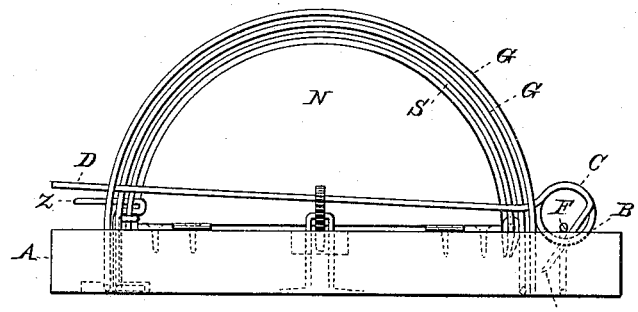

Figure 1 of the drawings is a representation of this invention, and is a top view. Fig. 2 is an end view. Fig. 3 is a vertical section.

This invention has relation to animal-traps; and it consists in the construction and novel arrangement of devices, as hereinafter set forth, and pointed out in the appended claim.

In the accompanying drawings, the letter A designates the base, which is usually made of wood. Near one end are formed the recess-seats B for the spiral springs C. Each spring has one end, D, free and extended to form the catch-arm, while the other end, E, is driven into the base to hold the spring. In order to secure these springs still more firmly to the base, a strong staple-shaped wire, F, is extended through the barrel portions of the springs, and has its prongs driven into the base, or through the same, to be clinched underneath.

Each catch-arm D plays between the parallel wire bows or arches G, which extend over the base, near the ends thereof, and centrally under each bow or arch is pivoted the trigger H, the outer end of which is turned upward and inward over the pivotal point to form a hook, K, while the inner end, L, is extended toward the center of the base. This inner end or arm, L, is designed to hold the bait.

A partition-plate, N, is secured in position across the central portion of the base to separate the double trap into two compartments, so that when an animal is caught in one it will not interfere with the operation of the other. Two traps are thus laterally arranged on the base-board, and S is an arched wire or metal cover which is designed to extend over the portion between the bows or arches G, and serves to prevent the bait from being approached from any direction except through the arches and over the spring-arms. This cover S is usually hinged to the base and fastened by a turning catch, Z.

The operation is as follows: The trap is set by baiting and engaging the hook end of the trigger with the catch-arm of the spring, so that the latter is held down in horizontal position. The animal reaching over the catch-arm to get the bait pulls the inner arm of the trigger upward, disengaging the spring-arm, which flies up and striking the animal with great force, usually under the neck, throws him against the upper portion of the arch G, where he is firmly held and generally killed by the breaking of the neck or by strangulation.

Having described this invention, what I claim, and desire to secure by Letters Patent, is—

The double trap having the parallel bows or arches secured to the base near each end, the spiral springs and their catch-arms extending between the bow-wires, the central partition-plate, and the trigger, respectively pivoted under a bow and having its inner end extended to hold the bait, and its outer end secured over the pivotal point to form a hook adapted to engage the spring catch-arm, substantially as specified.

In testimony whereof I affix my signature in presence of two witnesses.

WILLIAM T. MOORE.

Witnesses:
J. L. GORNZ,
D. W. TORIES.